(12) United States Patent
Aumann et al.

(10) Patent No.: US 12,534,027 B2
(45) Date of Patent: Jan. 27, 2026

(54) TRIM PART

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 422 days.

(21) Appl. No.: 18/112,691

(22) Filed: Feb. 22, 2023

(65) Prior Publication Data

US 2023/0264637 A1 Aug. 24, 2023

(30) Foreign Application Priority Data

Feb. 23, 2022 (DE) ...................... 10 2022 104 234.0

(51) Int. Cl.
*B60R 13/02* (2006.01)
*B60Q 3/54* (2017.01)

(52) U.S. Cl.
CPC ................ *B60R 13/02* (2013.01); *B60Q 3/54* (2017.02)

(58) Field of Classification Search
CPC ... B60Q 3/14; B60Q 3/20; B60Q 3/54; B60Q 3/70; B60R 13/02; B60R 2013/0287
See application file for complete search history.

(56) References Cited

U.S. PATENT DOCUMENTS

| | | | |
|---|---|---|---|
| 3,009,235 A * | 11/1961 | De Mestral | B65H 75/28 24/448 |
| 6,397,638 B1 | 6/2002 | Roell | |
| 2004/0166282 A1* | 8/2004 | Kingsford | A44B 18/0092 428/95 |
| 2006/0149210 A1* | 7/2006 | Sawyer | A44B 18/0034 604/391 |
| 2015/0250271 A1* | 9/2015 | Ogilvie | A44B 18/00 24/444 |
| 2016/0229338 A1 | 8/2016 | Sato | |
| 2017/0291536 A1 | 10/2017 | Cannon | |
| 2021/0252828 A1 | 8/2021 | Eitel et al. | |

FOREIGN PATENT DOCUMENTS

| | | |
|---|---|---|
| DE | 198 47 331 A1 | 4/2000 |
| DE | 20 2009 001 216 U1 | 4/2009 |
| DE | 10 2011 114 974 A1 | 4/2013 |
| DE | 10 2015 013 669 A1 | 4/2017 |
| DE | 10 2020 122 441 A1 | 3/2021 |
| DE | 10 2020 123 661 A1 | 3/2021 |
| DE | 10 2020 104 078 A1 | 8/2021 |

OTHER PUBLICATIONS

EP 3587641 A1 (Year: Jan. 2020).*
DE 102020122441 A1 (Year: Mar. 2021).*
(Continued)

*Primary Examiner* — Lori Lyjak
(74) *Attorney, Agent, or Firm* — Crowell & Moring LLP

(57) ABSTRACT

A trim part has a carrier part and a surface cover which is disposed on a side of the carrier part that faces the surface cover. The surface cover is made from an inherently stiff knitted fabric material.

14 Claims, 2 Drawing Sheets

(56) References Cited

OTHER PUBLICATIONS

U.S. Non-Final Office Action issued in U.S. Appl. No. 18/112,697 dated Jun. 23, 2023 (8 pages).
German-language Search Report issued in German Application No. 10 2022 104 234.0 dated Nov. 11, 2022 with partial English translation (11 pages).
German-language Search Report issued in German Application No. 10 2022 104 235.9 dated Nov. 9, 2022 with partial English translation (11 pages).

* cited by examiner

TRIM PART

CROSS REFERENCE TO RELATED APPLICATIONS

This application claims priority under 35 U.S.C. § 119 from German Patent Application No. DE 102022104234.0, filed Feb. 23, 2022, the entire disclosure of which is herein expressly incorporated by reference.

This application contains subject matter related to U.S. application Ser. No. 18/112,697, entitled "Cladding Part," filed on Feb. 22, 2023.

BACKGROUND AND SUMMARY

The present invention relates to a trim part and, in particular, to a trim part for a motor vehicle.

In the modern automotive industry, surfaces in the vehicle interior, or in the passenger cell of motor vehicles, are provided with decors so as to generate a visually appealing impression for the vehicle occupant. There are a multiplicity of surface variants (leather, artificial leather, films, textiles) for the interior trim components, or trim parts, which are applied to a carrier by way of different laminating methods. For example, a knitted spacer fabric, a foam backing or a non-woven fabric is currently used as a haptic layer for laminated interior trim components. The established procedure here is to adhesively bond decors, which are present in the form of films with a wood look or a carbon look, for example, to a plastics material carrier. Moreover, it is also known for skins of leather or artificial leather to be mounted on carrier structures with the aid of laminating methods, for example press-laminating methods or similar laminating methods, for example without a fixed upper tool, in order for a leather look to be generated. In this laminating procedure, the films or the skins are connected in a materially integral manner to the underlying carrier structure with the aid of an adhesive. The heat for activating the adhesive is incorporated into the adhesive joint via thermal contact by way of a warm press die of the press-laminating tool, or by means of IR radiation through the skin. As a result, the adhesive is activated during the laminating method and connects the film, or the skin, to the carrier structure.

However, owing to the materials used and owing to the production methods used, many of these surfaces have limitations in terms of the potential applications of the trim parts in the vehicle interior.

It is known from US 2016/0229338 A1 to provide trim parts with a knitted surface and for the trim parts to be backlit.

Proceeding from this prior art, the present invention is based on the object of providing a trim part by way of which the disadvantages of the prior art are overcome. It is a particular object of the invention to provide a trim part which is distinguished by a surface of a particularly high perceived quality.

In order for this and other objects to be achieved, the invention proposes a trim part having a carrier part and a surface cover. The surface cover is disposed on a first side of the carrier part and is made from an inherently stiff knitted fabric material. The inherent stiffness of the surface cover offers the advantage that the surface cover, in regions where the surface cover is not supported by the carrier part, is not deformed despite the dead weight acting thereon. This offers the advantage that any potential edges of the carrier part are not reproduced on a visible surface of the trim part. In other words, the knitted fabric material offers sufficient inherent stability or stiffness, which allows clearances or penetrations in the underlying carrier part to be spanned without outlines being reproduced on the surface of the surface cover.

Furthermore, the surface cover can be configured with two layers, having a first layer that is made from knitted fabric material and forms a visible surface of the surface cover in the trim part, and, lying therebeneath, an inherently stiff layer which is not visible in the trim part. This offers the advantage that an inherently stiff layer that forms the rear side can be provided on a rear side of the surface cover, or the visible decor layer. This inherently stiff layer can be made for example from a polyester mesh or similar materials. Alternatively, further plastics-based materials may be used for the inherently stiff proportion of the cover, in particular non-woven fabrics (for example, needle-bonded non-woven fabrics, randomly oriented fiber or hydroentangled non-woven fabrics), polypropylene mesh, natural fiber/polypropylene, knitted spacer fabrics, etc.

The inherently stiff layer can be configured so as to be translucent. This offers the advantage that incident light on the inherently stiff layer can penetrate the layer. In this way, light effects can be implemented on the visible surface of the trim part.

At least one light source can be provided on a side of the carrier part that faces away from the surface cover. As a result, light emanating from the light sources can penetrate the carrier part and, by way of the inherently stiff layer, be directed into the knitted fabric and thus through the knitted fabric.

In an alternative embodiment, the material of the carrier part can be opaque, and translucent perforations can be provided in the carrier part. These perforations can optionally be filled with ambient air or be closed by a translucent solid. This embodiment offers the advantage that discrete regions which are transparent can be locally provided, wherein shading of the light source is generated in the remaining regions, in which the carrier material is opaque.

In one variant of the trim part, the surface cover can be releasably connected to the carrier part. This offers the advantage that the surface cover is exchangeable.

The trim part is preferably an interior component for the interior of a vehicle, such as, for example, dashboards, door trims, armrests, central consoles, lockable storage compartments such as gloveboxes, etc. Gloveboxes can be trimmed on the outside or on the inside. In this way, 2D-/3D-knitted fabrics can be used as interior surfaces.

However, the trim part may also be used for other means of transportation such as aircraft, ships, trains, etc. The use of the trim part in items of furniture or interior furnishings is also contemplated.

In the context of the invention, a knitted material or a knitted fabric is to be understood to be a planar textile. The knitted fabric is preferably designed using a front-side knitted fabric and a rear-side knitted fabric, the front-side knitted fabric and the rear-side knitted fabric preferably being in each case produced from a yarn or a monofilament. The yarn according to the invention is in turn designed using a multiplicity of filaments. For example, one yarn comprises 50 to 100, in particular 70 filaments. The filaments are preferably made from a plastics material and/or an aramid and/or a similar material. Owing to its special production process, a 3D-knitted fabric is produced three-dimensionally and consequently differs from a two-dimensional, flat knitted fabric in terms of handling, manufacturing and the requirements pertaining to fastening and processing. A 3D-knitted fabric is in most instances made for covering a carrier component, this advantageously enabling processing with reduced or even zero cutting waste.

Furthermore, at least one fastening element can be disposed on the surface cover, and at least one fixing element can be disposed on the carrier part, the at least one fastening element of the surface cover being able to be connected in a form-fitting manner to the at least one fixing element of the carrier part.

The fastening element can be configured as a perforation, a fir-tree plug, a C-clip, or formed from a combination of these geometries.

The surface cover, at least in portions, can be in physical contact with a surface of the carrier part that has to be covered, the at least one fastening element being able to be connected in a form-fitting manner to at least one fixing element.

Furthermore, a securing device can be disposed on the fixing element.

Moreover, a plurality of fastening elements can be disposed on a surface of the surface cover that faces the carrier element, and a plurality of fixing elements can be disposed on a surface of the carrier part that faces the surface cover.

In a first embodiment, the fastening elements are disposed only in a peripheral region of a surface of the surface cover that faces the carrier part, the peripheral region extending along the circumference of surface cover.

Alternatively, the fastening elements can be disposed on a surface of the surface cover that faces the carrier part, the fastening elements being distributed across the entire surface.

Furthermore the fastening elements can be disposed on a surface of the surface cover that faces the carrier part, the fastening elements being disposed in a peripheral region of the surface cover, the peripheral region completely surrounding the surface cover or being formed only in regions.

By way of the fastening elements, the surface cover can be applied to the carrier part, tensioned thereon and fixed thereto without the use of an adhesive. As a result, not only is the adhesive process dispensed with, but also the potential interchangeability and recycling capability of the dashboard are enabled. Owing to the form-fitting connection between the surface cover and the carrier part, the surface material can be removed in a non-destructive manner from the carrier part. In this way, it is not necessary for the entire trim part, for example the cockpit, to be changed in order for the surface or the surface cover to be changed. Changing the surface cover may become necessary in the event of damage or contamination of the surface cover during use. Moreover, interchangeable surface covers offer advantages with a view to enabling the trim part to be individualized or personalized with different design options. Moreover, the trim parts can be subjected to an upgrade or even be modified. Misalignments can also arise during assembling so that it becomes necessary for the surface cover to be removed and repositioned. Last but not least, when disposing of trim parts such as, for example the cockpit of a vehicle, the surface material can be removed in a particularly simple manner from the surface material by releasing the form-fitting connection, this leading to corresponding degrees of freedom and simplifications during recycling. Since the surface cover has been produced from a homogeneous material, for example from polyester fibers, the surface cover can be resupplied to recycling as a homogeneous material. As a result of the simple capability of separating the surface cover and the carrier part, both the surface cover and the carrier part are suitable for recycling as homogeneous material, the degree of recycling per vehicle being increased in this way.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
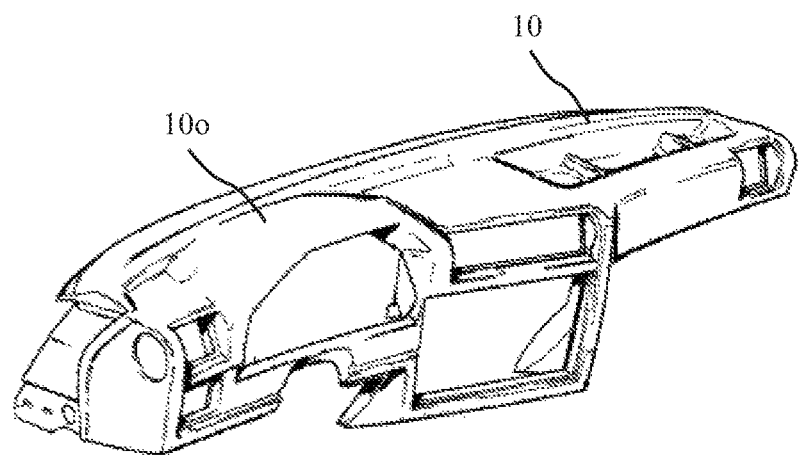
FIG. 1 is a perspective view of an exemplary carrier part.

FIG. 1 shows by way of example a dashboard support 10 which, as the carrier part 10, is intended to serve in the explanation of the method. As an alternative to the dashboard support illustrated, all the trim parts located in the interior can also serve as the carrier structure 10, such as gloveboxes, center armrests, center consoles, visors, armrests in the door trims, door trims, headliners, rear consoles, pillar trim parts, etc. This dashboard support 10 has a surface 10o which is intended to be covered with the aid of a surface cover 20. As is illustrated in FIG. 1, this surface 10o may relate to only a portion such as, for example, the upper surface of the binnacle of the so-called combination instrument. However, the surface 10o to be covered can also be that part of the surface of the carrier part 10 that would be visible to a vehicle occupant in the interior of the vehicle. Furthermore alternatively, the surface 10o can also comprise the entire surface of the carrier part 10, regions of the carrier part 10 that are not-visible to a vehicle occupant also being laminated in this instance.

Figure 2:
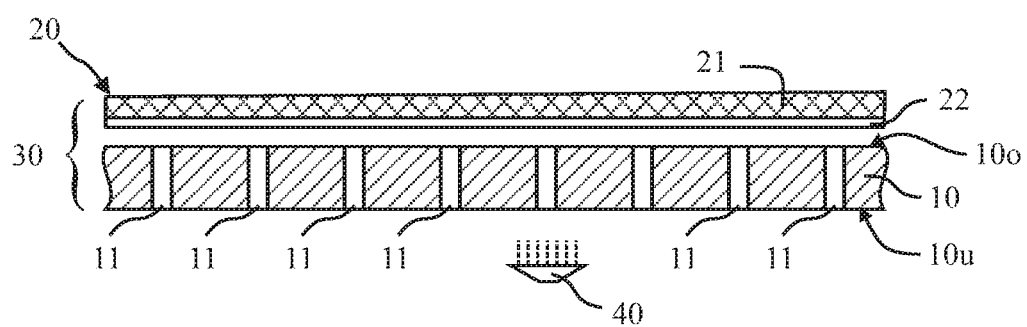
FIG. 2 is an exemplary sectional view through a trim part prior to the application of the surface cover.

A trim part 30 is depicted in FIG. 2, specifically in a partially exploded illustration. The surface cover 20 here has not yet been applied to the carrier part 10. The surface cover 20 is of a two-layer construction and has a first layer 21 which forms a decor layer that is visible to a vehicle occupant. Provided therebelow in the figure is a second layer 22 which is in physical contact with the first layer 21. The second layer 22 thus forms a backing material which has adequate features in terms of stiffness and stability. For example, the first layer 21 can be connected in a form-fitting manner to the second layer 22.

The carrier part 10 has a surface 100 that faces the surface cover 20. The surface cover 20 is applied to this surface. A form-fitting connection between the second layer 22 of the surface cover 20 and the surface 100 of the carrier part 10 can be generated in the process, for example. By way of example, a light source 40 is depicted in FIG. 2 on a side 10u of the carrier part 10 that lies opposite the surface cover 20. The light source 40 emits light, which, by way of perforations 11, can shine through opaque material of the carrier part 10.

Figure 3:
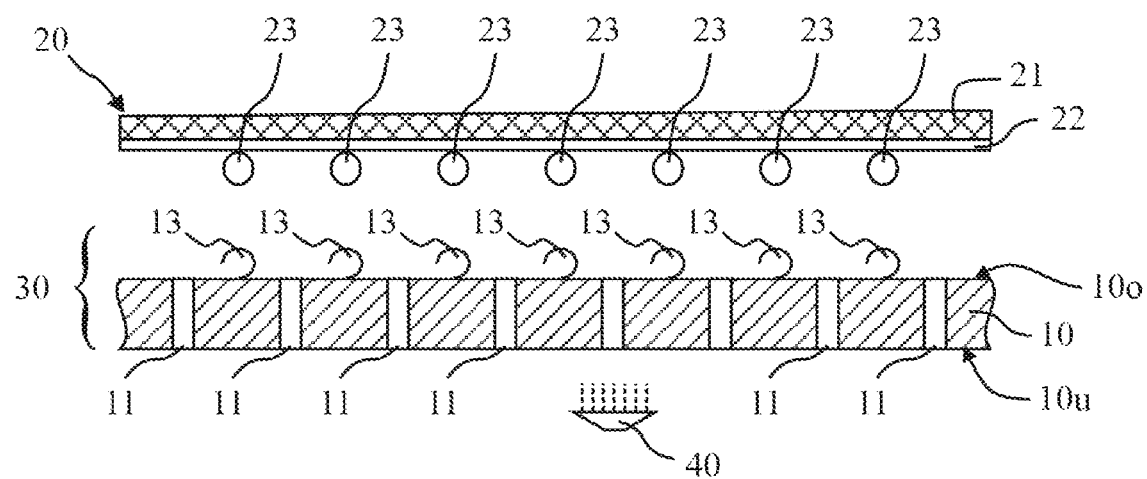
FIG. 3 is an exemplary sectional view through a trim part before the surface covering is applied.

FIG. 3 shows a cross section through a trim part 30 for a vehicle interior of a vehicle, not shown in detail. The trim part 30 comprises a carrier part 10 onto which a surface covering 20 is mounted. The carrier part 10 has a surface 100 facing the surface covering 20. Fixing elements 13 are provided on this surface 100, which are shown here as hook-shaped by way of example. In non-illustrated embodiments, the fixing elements 13 can also have other shapes. What is decisive, however, is that the fixing elements 13 can enter into a form-fitting connection with the fastening elements 23, for example. The fastening elements 23 are arranged on a surface of the surface cover 20 facing the carrier part 10. In FIG. 2, these are shown as loops with a circular cross-section by way of example. In further embodiments not shown in the figures, the fastening elements can also have a different configuration. The only decisive factor is the possibility of entering into a form-fitting connection with the fixing elements 13 of the carrier part 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trim part, comprising:
   a carrier part; and
   a surface cover disposed on a side of the carrier part that faces the surface cover,
   wherein the surface cover is made of an inherently stiff knitted fabric material,
   wherein at least one fastening element is disposed on the surface cover,
   wherein at least one fixing element is disposed on the carrier part, and
   wherein the at least one fastening element of the surface cover is connected in a form-fitting manner to the at least one fixing element of the carrier part.

2. The trim part according to claim 1, wherein
   the surface cover, at least in portions, is in physical contact with a surface of the side of the carrier part that is covered.

3. The trim part according to claim 1, wherein
   a securing device is disposed on the fixing element.

4. The trim part according to claim 1, wherein
   the at least one fastening element is integrally knitted into the surface cover.

5. The trim part according to claim 1, wherein
   a multiplicity of fastening elements are disposed on a surface of the surface cover that faces the carrier part, and
   a multiplicity of fixing elements are disposed on a surface of the side of the carrier part that faces the surface cover.

6. The trim part according to claim 1, wherein
   the fastening elements are disposed only in a peripheral region of a surface of the surface cover that faces the carrier part, the peripheral region extending along a circumference of the surface cover.

7. The trim part according to claim 1, wherein
   the fastening elements are disposed on a surface of the surface cover that faces the carrier part, the fastening elements being distributed across an entirety of the surface.

8. The trim part according to claim 1, wherein
   the fastening elements are disposed on a surface of the surface cover that faces the carrier part, the fastening elements being disposed in a peripheral region of the surface cover, the peripheral region completely surrounding the surface cover or being formed only in regions.

9. The trim part according to claim 1, wherein
   after generating the surface cover, pre-existing fastening elements are sewn to the surface cover.

10. The trim part according to claim 1, wherein
    the surface cover is configured with two layers comprising a layer of knitted fabric material on which an inherently stiff layer is disposed.

11. The trim part according to claim 10, wherein
    the inherently stiff layer is translucent.

12. The trim part according to claim 1, wherein
    at least one light source is provided on a side of the carrier part that faces away from the surface cover.

13. The trim part according to claim 1, wherein
    a material of the carrier part is opaque, and translucent perforations are provided in the carrier part.

14. The trim part according to claim 1, wherein
    the surface cover is releasably connected to the carrier part.

* * * * *